United States Patent
Reed

(10) Patent No.: US 7,673,843 B2
(45) Date of Patent: Mar. 9, 2010

(54) ROTATABLE PEDESTAL

(76) Inventor: Petra Reed, 229 Fulton St., Redwood City, CA (US) 94062

( * ) Notice: Subject to any disclaimer, the term of this patent is extended or adjusted under 35 U.S.C. 154(b) by 0 days.

(21) Appl. No.: 11/732,229

(22) Filed: Apr. 2, 2007

(65) Prior Publication Data

US 2007/0228244 A1    Oct. 4, 2007

Related U.S. Application Data

(60) Provisional application No. 60/789,537, filed on Apr. 4, 2006, provisional application No. 60/789,548, filed on Apr. 4, 2006.

(51) Int. Cl.
*A47B 91/00* (2006.01)
*E04G 3/00* (2006.01)

(52) U.S. Cl. .................. 248/349.1; 248/282.1; 248/416

(58) Field of Classification Search ............. 248/349.1, 248/282.1, 346.01, 274.1, 576.1, 283.1, 416; 248/418, 425; 211/49.1, 53, 56, 70, 131.1, 211/131.2, 144, 163, 164, 196, 205, 65, 66; 297/344.24; 108/59, 92, 93, 94, 97, 101, 108/103

See application file for complete search history.

(56) References Cited

U.S. PATENT DOCUMENTS

| 243,567 A | 6/1881 | Ireland |
| 554,661 A | 2/1896 | Doolittle |
| 1,298,762 A | 4/1919 | Milligan |
| 1,443,420 A | 1/1923 | Lennox |
| 2,119,821 A | 6/1938 | Manley |
| D118,463 S | 1/1940 | West |
| 3,176,676 A | 4/1965 | Caldwell ..................... 126/25 |
| 3,538,862 A | 11/1970 | Patriarca ..................... 108/59 |
| D221,781 S | 9/1971 | Calgan ........................... D6/3 |
| 3,858,495 A | 1/1975 | Gotwalt ................. 99/421 HH |
| 4,181,281 A * | 1/1980 | Kosak ........................ 248/416 |
| 4,316,634 A * | 2/1982 | Roesler .................. 297/344.24 |
| D287,677 S | 1/1987 | Pomeroy et al. ............. D6/449 |
| 4,687,167 A * | 8/1987 | Skalka et al. ................ 248/126 |
| 4,760,802 A | 8/1988 | Leong ......................... 108/157 |
| 4,798,361 A * | 1/1989 | Fawcett ..................... 248/415 |
| D321,101 S | 10/1991 | Zucker ......................... D6/479 |
| D328,536 S | 8/1992 | Ma ................................ D6/460 |
| 5,269,231 A | 12/1993 | Johnson ....................... 108/23 |
| 5,353,716 A | 10/1994 | Wilbert ....................... 108/150 |
| 5,425,198 A | 6/1995 | Coy .............................. 47/18 |
| 5,490,652 A * | 2/1996 | Martin ..................... 248/282.1 |
| 5,829,602 A | 11/1998 | St. John Danko .......... 211/13.1 |
| 5,842,425 A | 12/1998 | Van der Aa .................. 108/64 |
| 5,887,513 A | 3/1999 | Fielding et al. ........... 99/421 A |
| 5,996,819 A | 12/1999 | Klein ........................ 211/85.14 |
| 5,996,820 A | 12/1999 | Broadnax ................... 211/85.4 |

(Continued)

OTHER PUBLICATIONS

U.S. Appl. No. 10/734,868, filed Dec. 2003, Reed.

(Continued)

*Primary Examiner*—Anita M King
(74) *Attorney, Agent, or Firm*—T. H. P. Richardson

(57) ABSTRACT

A pedestal comprising lower and upper vertical columns having different vertical axes, and a horizontal support which is rotatably connected to the top of the lower column and the bottom of the upper column. The pedestals are particularly useful in the catering and hospitality industries for supporting food and beverage containers, tableware, flower vases and sculptures.

26 Claims, 2 Drawing Sheets

U.S. PATENT DOCUMENTS

| | | |
|---|---|---|
| 6,095,468 A * | 8/2000 | Chirico et al. ............ 248/282.1 |
| 6,158,360 A | 12/2000 | Cheng ........................ 108/103 |
| 6,182,841 B1 | 2/2001 | Klein ...................... 211/85.14 |
| D446,043 S | 8/2001 | Stoppenhagen et al. ...... D6/396 |
| 6,314,869 B1 | 11/2001 | Bourgeois, Jr. .............. 99/340 |
| D453,372 S | 2/2002 | Pecoskie .................... D23/332 |
| 6,505,804 B1 | 1/2003 | Francis et al. |
| 6,688,573 B2 | 2/2004 | Reed et al. ............. 248/346.01 |
| 6,877,442 B2 | 4/2005 | Helle ......................... 108/147 |
| 6,915,994 B2 | 7/2005 | Oddsen |
| 7,004,437 B2 * | 2/2006 | Bauer et al. .............. 248/282.1 |

OTHER PUBLICATIONS

PCT/US 2007/008444, International Preliminary Report on Patentability Mailed Oct. 16, 2008.

* cited by examiner

ROTATABLE PEDESTAL

CROSS-REFERENCE TO RELATED APPLICATIONS

This application claims priority from Provisional Application No. 60/789,537, filed Apr. 4, 2006, and is related to (1) copending, commonly assigned application Ser. No. 10/734,868, filed Dec. 12, 2005, which was published as US Publication No. 2004/0124324, (2) application Ser. No. 10/117,686, filed Apr. 5, 2003, now U.S. Pat. No. 6,688,573, and (3) application Ser. No. 09/905,702, filed Aug. 2, 2001, now abandoned. This application is also related to the copending, commonly assigned, application filed contemporaneously with this application by Petra Reed and James P. Reed, which claims priority from U.S. Provisional Application No. 60/789,548, filed Apr. 4, 2006, and which is entitled Block Pedestal. The disclosure of each of the above-identified applications, publication and patent is incorporated herein by reference for all purposes.

BACKGROUND OF THE INVENTION

This invention relates to pedestals. The term "pedestal" is used herein to denote a structure which can be placed on a surface, often a horizontal surface, for example on the earth, on the floor of a building, or on an elevated surface (for example a buffet or other table, sideboard or desk) and which will support objects (e.g. tableware of all kinds, foodstuffs for consumption, and other objects being displayed for commercial and/or aesthetic purposes) placed on top of, or at intermediate levels of, the pedestal. For example, pedestals are widely used in the catering and hospitality industry to support serving dishes, containers, platters, trays, jugs, glasses, bottles, cutlery, ice sculptures and flower vases at positions chosen for functional and/or decorative reasons.

SUMMARY OF THE INVENTION

We have discovered, in accordance with the present invention, novel pedestals; novel pedestal components which can be assembled, optionally with known pedestal components, into novel pedestals; novel kits containing pedestal components; novel methods for making pedestals; and novel methods of displaying objects on pedestals.

In normal use, the pedestals of the invention comprise one or more generally vertical components, referred to herein as "columns", and one or more generally horizontal components, referred to herein as "supports". The references herein to vertical, horizontal, top, bottom, upper and lower assume that the pedestal is being used normally. However, the invention includes the possibility that the pedestal is in a different orientation, and the terms vertical and horizontal are used to include variations from the strictly vertical and strictly horizontal directions which do not have any substantial effect on the function of the components in question.

In a first preferred aspect, this invention provides a pedestal which comprises (1) a first lower vertical column having a top and a bottom and a first lower vertical axis, (2) a first upper vertical column having a top and a bottom and a first upper vertical axis which is different from the first lower vertical axis, and (3) a first intermediate horizontal support having a lower surface and an upper surface;

the lower surface of the first intermediate support being rotatably connected to the top of the first lower column so that the first intermediate support can be rotated in a horizontal plane relative to the first lower column; and the upper surface of the first intermediate support being connected to the bottom of the first upper column so that rotation of the first intermediate support relative to the lower column changes the relative positions of the first upper vertical axis and the first lower vertical axis.

The term "vertical axis" is used herein in relation to a column to denote a vertical line which passes through the center of gravity of the column. Preferably the connection between the upper surface of the first intermediate support and the bottom of the first upper column is a rotatable connection such that the first intermediate support can be rotated in a horizontal plane relative to the first upper column.

In some embodiments, the pedestal of the first aspect of the invention can be used on its own, but, as further discussed below, it is advantageously used in association with other pedestal components to form a larger pedestal.

In a second preferred aspect, this invention provides a support which can be used as the first intermediate support of a pedestal according to the first aspect of the invention, the support comprising a lower surface having a lower conformation which enables a lower column to be rotatably connected thereto and an upper surface having an upper conformation which is laterally offset from the lower conformation and which enables an upper column to be rotatably connected thereto.

In a third preferred aspect, this invention provides kits containing components for assembling one or more pedestals of the first aspect of the invention, and optionally a plurality of other components which can be assembled with the pedestal(s) of the first aspect of the invention to form larger pedestals. The components of a kit can be packed into any suitable container, optionally having compartments for different components, for example a box or a bag, e.g. a cardboard box or a fabric bag. A kit comprising components for a plurality of separate pedestal bases, and other components, can be assembled into a wide variety of pedestals of different functionalities, shapes, dimensions and decorative appearances. The invention makes it possible for users to transport a kit of relatively small dimensions to, for example, a particular catering or display event, and to construct, on site, one or more pedestals adapted to the particular requirements of the event. The components are preferably such that, after the event, they can be easily disassembled, cleaned (for example in commercial washing facilities) and repacked as a compact kit for transport to storage or to another event.

In a fourth preferred aspect, this invention provides a method of making a pedestal, preferably a pedestal according to the first aspect of the invention, which comprises placing, preferably placing by manual forces only (i.e. without the use of tools), pedestal components together, the components comprising at least two columns and at least one support, to form a pedestal in which at least one column and at least one support contacting said column are rotatably secured to each other, preferably only by gravitational forces (including gravitational forces resulting from the objects on the pedestal), and in which rotation of said contacting column and support relative to each other changes the relative positions of two columns.

In a fifth preferred aspect, this invention provides a method of displaying objects which comprises placing the objects on a pedestal according to the first aspect of the invention, a pedestal comprising a support according to the second aspect of the invention, a pedestal made by assembling components from a kit according to the third aspect of the invention, or a pedestal made by a method according to the fourth aspect of the invention.

BRIEF DESCRIPTION OF THE DRAWINGS

The invention is illustrated by the accompanying drawings, which are diagrammatic and not to scale, and in which.

FIG. 5 is a side view of a pedestal of the invention, and.

DETAILED DESCRIPTION OF THE INVENTION

Figure 1:
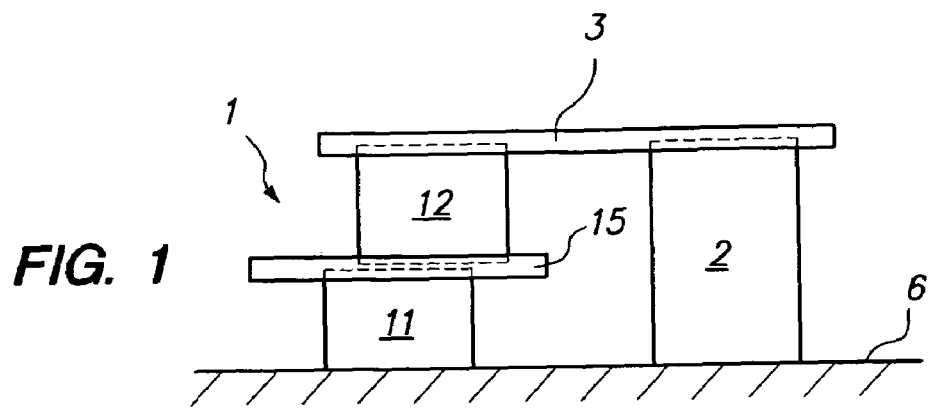
FIGS. 1 and 2 are side and plan views of a pedestal of the invention.

In the Summary of the Invention above, and in the Detailed Description of the Invention, and in the accompanying drawings, reference is made to particular features of the invention. It is to be understood that the disclosure of the invention in this specification includes all possible combinations of such particular features. For example, where a particular feature is disclosed in the context of a particular aspect, a particular embodiment, or a particular Figure, that feature can also be used, to the extent appropriate, in the context of other particular aspects, embodiments, and Figures, and in the invention generally.

The term "comprises" and grammatical equivalents thereof are used herein to mean that other elements (i.e. components, ingredients, steps etc.) are optionally present. For example, a pedestal "comprising" (or "which comprises") components A, B and C can contain only components A, B and C, or can contain not only components A, B and C but also one or more other components. The term "at least" followed by a number is used herein to denote the start of a range beginning with that number (which may be a range having an upper limit or no upper limit, depending on the variable being defined). For example "at least 1" means 1 or more than 1. When, in this specification, a range is given as "(a first number) to (a second number)" or "(a first number)-(a second number)", this means a range whose lower limit is the first number and whose upper limit is the second number. For example, "from 8 to 20 inches" or "8-20 inches" means a range whose lower limit is 8 inches, and whose upper limit is 20 inches. The terms "plural" and "plurality" are used herein to denote two or more than two items.

Where reference is made herein to "first" and "second" elements, this is often done for identification purposes; unless the context requires otherwise, the first and second elements can be the same or different, and reference to a first element does not mean that a second element is necessarily present (though it may be present). Where reference is made herein to "a" or "an" element, this includes the possibility that there are two or more such elements (except where the context excludes that possibility). Where reference is made herein to two or more elements, this includes the possibility that the two or more elements are replaced by a lesser number or greater number of elements providing the same function (except where the context excludes that possibility). The numbers given herein should be construed with the latitude appropriate to their context and expression; for example, each number is subject to variation which depends on the accuracy with which it can be measured by methods conventionally used by those skilled in the art.

First Aspect of the Invention

The pedestals of the first aspect of the invention often include at least one additional column and/or at least one additional support.

In one exemplary embodiment, the pedestal further comprises (4) a second lower vertical column having a top and a bottom and a second lower vertical axis, (5) a second upper vertical column having a top and a bottom and a second upper vertical axis which is different from the second lower vertical axis, and (6) a second intermediate horizontal support having a lower surface and an upper surface;

the lower surface of the second intermediate support being rotatably connected to the top of the second lower column so that the second intermediate support can be rotated in a horizontal plane relative to the second lower column; and the upper surface of the second intermediate support being rotatably connected to the bottom of the second upper column so that rotation of the second intermediate support relative to the second lower column changes the relative positions of the second upper to the vertical axis and the second lower vertical axis; and (7) an auxiliary horizontal support having a lower surface which is (a) rotatably connected to the top of the first upper column, and (b) rotatably connected to the top of the second upper column.

In another exemplary embodiment, the pedestal further comprises (4) an auxiliary column having a third vertical axis, and (5) an auxiliary support having a lower surface which is (a) rotatably connected to the top of the first upper column, and (b) rotatably connected to the top of the auxiliary column.

In another exemplary embodiment, the pedestal comprises (1) a first cylindrical lower column having a top, a bottom, and a first lower vertical axis, (2) a first cylindrical upper column having a top, a bottom, and a first upper vertical axis which is different from the first lower vertical axis, (3) a first intermediate support having a lower surface and an upper surface;

(4) a second cylindrical column having a top, a bottom and a second vertical axis which is different from (i) the first lower vertical axis and (ii) the first upper vertical axis; and (5) an upper support;

the lower surface of the intermediate support including a recess into which fits the top of the first lower column so that the first intermediate support can be rotated relative to the first lower column about the first lower vertical axis;

the upper surface of the intermediate support including a recess into which is fitted the bottom of the first upper column so that the first intermediate support can be rotated relative to the first upper column about the first upper vertical axis; and the upper support having a lower surface which includes (a) a recess into which fits the top of the first upper column so that the upper support can be rotated relative to the first upper column about the first upper vertical axis, and (b) a recess into which fits the top of the second column so that the upper support can be rotated relative to the second column about a second vertical axis which is different from (i) the first lower vertical axis and (ii) the first upper vertical axis.

As will be apparent to those skilled in the art from that their own knowledge and the disclosure in this specification, a very wide variety of pedestals can be assembled using one or more pedestals according to the first aspect of the invention and a plurality of additional support members and/or columns, most or all of the connections between the columns and the support members being rotatably adjustable so that the pedestal can be fitted to the horizontal space available for the pedestal and provide desired surfaces for displaying objects.

The rotatable connections between a column and a support can be of any kind. Spaced-apart connections in the same pedestal can be the same or different. The connection is preferably such that the support and the column can be assembled together, and/or disassembled, by manual forces only, i.e. without the use of tools of any kind. Preferably, the rotatable connection, once made (with or without the use of tools) is maintained by the forces of gravity only (including the weight of any objects on the pedestal).

In a preferred form of connection, the end of the column fits into a recess in the support or a projection on the support fits into a recess in the column. Preferably the end or the projection can rotate in the recess. Alternatively, the end or projection can be fixed in the recess, and the end, projection or recess can rotate relative to the remainder of the column and/or the support.

In some embodiments, the end or projection and the recess have dimensions such that the end or projection is capable only of rotational movement relative to the recess. For example, the end of a solid round column can fit into a round recess in a support; or the end of a column which is a cylindrical shell can fit into a round or annular recess in a support; or the support can have a cylindrical or annular projection which fits into or around the end of a column having an end which is a cylindrical shell or a cylinder. In other embodiments, the recess has dimensions such that both rotational and lateral movement is possible; for example, a column having a round end fits into a channel having the same width as the diameter of the end, the channel being straight or curved and preferably having semicircular ends.

The columns used in the present invention can be the same or different. The columns can have any cross-section, and the cross-section can be the same or different over the length of the column. For example, one or both ends of the column can have a cross section which will fit into, and rotate within, a recess in the support(s) to which the column is rotatably connected, e.g. an annular, round, equilateral triangular or other regular polyhedral (including fluted) cross-section; and the remainder of the column can have the same or a different cross-section. The corresponding recess in the support can be round or, particularly when the column has an annular or round cross-section, a channel into which the end of the column can be rotatably fitted. The column can be of any length (i.e. height) and/or width (e.g. diameter). In some embodiments, the column is no longer than is necessary to provide a rotatable connection between two support members, i.e. has a length which is substantially equal to the sum of the depths of the recesses in the supports which the column connects (in which case the column is not an important part of the visual appearance of the pedestal). Generally, however, at least one of the columns has a substantial length, for example at least 1 inch, e.g. 2-10 inch, for example 3-7 inch. The length of the column can be, for example, from 0.5 to 5 times the effective diameter of the column (the term "effective diameter" being used to denote the diameter of a cylindrical column or, for a non-cylindrical column of constant cross section, the diameter of a circle having the same cross-sectional area as a non-cylindrical column.

The horizontal supports used in the pedestals of the invention, including but not limited to, supports according to the second aspect of the invention, can be of any size and shape which enables the support to provide the defined functions. Generally the support is of uniform thickness, for example 0.25 to 1 inch, or 0.4 to 0.7 inch, e.g. about 0.5 inch. The shape of the support can for example be circular or oval or other regularly curved shape, or rectangular (including square), e.g. with rounded corners. The area of the support can for example be 5 to 400 in.$^2$, or 10 to 200 in.$^2$, for example 50 to 150 in.$^2$.

The conformations in the upper and lower surfaces of the support, which can be the same or different, can for example be recesses or projections. The outer periphery of a recess can, for example, be annular, round, or a regular polyhedron, so that a column which has a round cross-section, or another suitable cross section, can be fitted into and can rotate in the recess. The whole of the area within the periphery can be recessed, or, when for example the column has an annular cross section, at least at the end which fits into the recess, the recess can be annular in cross-section. (The term "annular" is used herein to include cross sections which are of irregular width When the conformation is a projection, it can be of any cross-section which will fit into a column which is recessed at the end into which the projection fits (and which may be hollow throughout its length) so that the column can rotate around the projection.

In some embodiments, the lower conformation is positioned so that the center of gravity of the support, when it is generally horizontal, lies within the conformation; for example the support is round, and the lower conformation has the same center as the support. In this way, the support can rest stably on a lower column which is fitted to that conformation. The upper conformation can be positioned so that the center of gravity of an upper column fitted thereto lies inside or outside the lower column. The weight of the support member can be substantially greater than, for example 2 to 20 times, or 4 to 10 times, the weight of at least the upper column fitted thereto, and optionally also by weight of the lower column fitted thereto.

When a pedestal of the invention includes a column whose top is not covered by a support, the top of the column can optionally include two or more channels into which can be slidably fitted two or more parallel horizontal support members as disclosed for example in US Publication No. 2004/0124324. For example, the upper periphery of a hollow cylindrical column can comprise 3-6 pairs of channels with 3-6 support members slidably fitted thereto.

Figure 2:
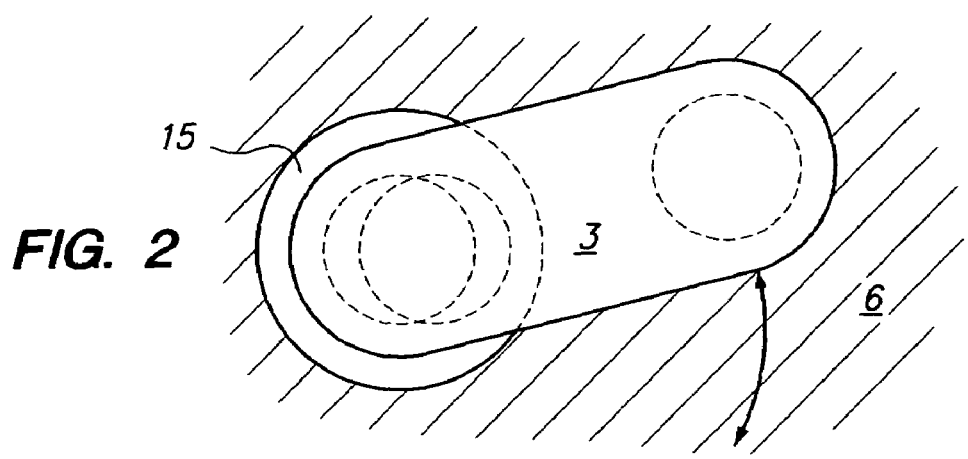
Figure 3:
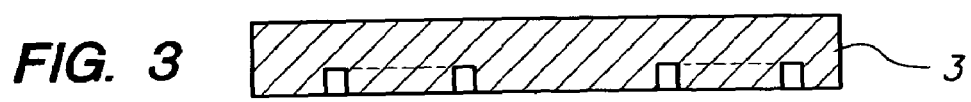
FIGS. 3 and 4 are cross-sections of the horizontal supports in FIGS. 1 and 2.
Figure 4:
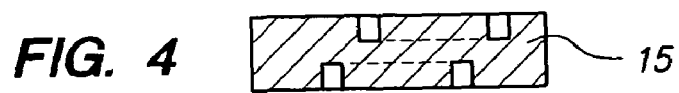
Figure 5:
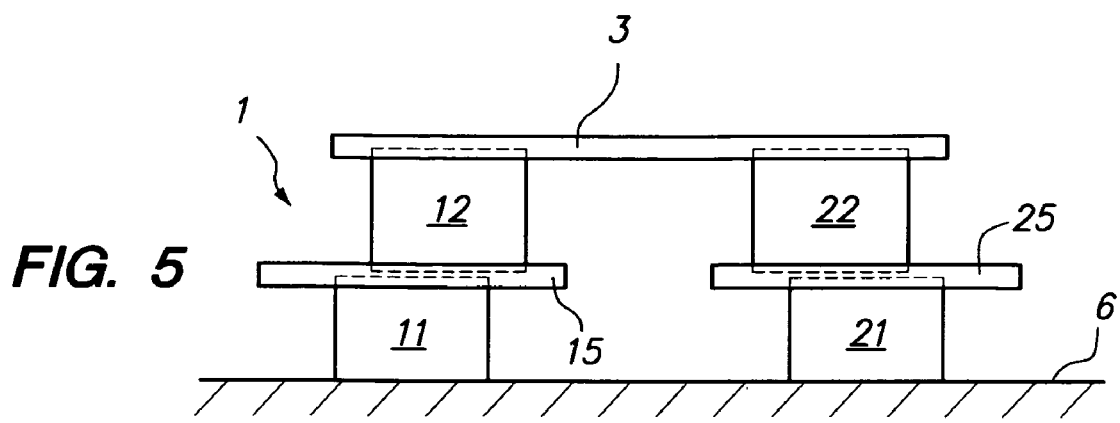
Figure 6:
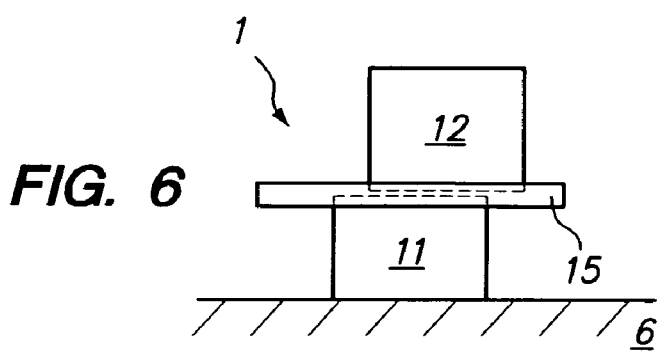
FIGS. 6 and 7 are side and plan views of a pedestal of the invention.
Figure 7:
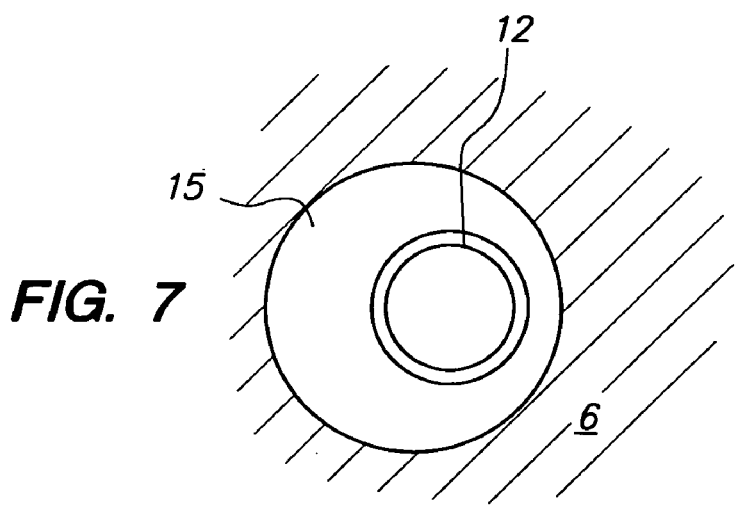

Referring now to the drawings, FIGS. 1 and 2 show a pedestal of the invention comprising first and second pedestal bases 1 and 2 and an upper support 3. The first pedestal base comprises a lower cylindrical column 11 having an annular cross-section, an upper cylindrical column 12 having an annular cross-section, and an intermediate support 15 to which the upper and lower columns are rotatably connected. The second pedestal base comprises a cylindrical column 2 having an annular cross-section. The upper support 3 is rotatably connected to the top of the upper column 12 and to the top of the column 2. FIGS. 3 and 4 are cross-sections of the supports 3 and 15 showing the circular grooves into which the columns 11, 12 and 2 are rotatably fitted. The supports 3 and 15 could for example alternatively be formed with circular recesses in place of the circular grooves, making it possible for the columns to be solid and/or to have a non-circular cross section which can fit into, and rotate within, the recess. FIG. 5 shows a pedestal of the invention, which is the same as the pedestal in FIG. 1 except that the second Pedestal base (like the first pedestal base) is composed of a lower cylindrical column. 21 having an annular cross-section, an upper cylindrical column. 22 having an annular cross-section, and an intermediate support. 25 to which the columns 21 and 22 are rotatably connected. FIGS. 6 and 7 show a pedestal of the invention, which consists of a lower cylindrical column 11, having an annular cross-section, and upper cylindrical column 12, having an annular cross-section, and an intermediate support 15, to which the upper and lower columns are rotatably connected. In FIGS. 1, 2, 5, 6 and 7 the lower cylindrical columns rest on a horizontal surface 6.

What is claimed is:

1. A pedestal which is placed on a horizontal surface and which comprises
    (1) a first lower vertical column having a top and a bottom and a first lower vertical axis, the bottom of the first lower vertical column resting on the horizontal surface,
    (2) a first upper vertical column having a top and a bottom and a first upper vertical axis which is different from the first lower vertical axis, and
    (3) a first intermediate horizontal support having a lower surface and an upper surface;
    the lower surface of the first intermediate support having a rotatable connection to the top of the first lower column so that the first intermediate support can be rotated in a horizontal plane relative to the first lower column; and the upper surface of the first intermediate support being connected to the bottom of the first upper column so that rotation of the first intermediate support relative to the lower column changes the relative positions of the first upper vertical axis and the first lower vertical axis; and
    the rotatable connection being maintained by the forces of gravity only.

2. A pedestal according to claim 1 wherein the upper surface of the first intermediate support is rotatably connected to the first upper column so that the first intermediate support can be rotated in the horizontal plane relative to the first upper column.

3. A pedestal according to claim 2 wherein each of the vertical columns is a cylindrical shell.

4. A pedestal according to claim 2 wherein the top of the first tower column fits into a recess in the lower surface of the intermediate support, and the bottom of the first upper column fits into a recess in the upper surface of the intermediate support.

5. A pedestal according to claim 2 which further comprises
    (4) an auxiliary column having a third vertical axis, and
    (5) an auxiliary horizontal support having a lower surface which is
        (a) rotatably connected to the top of the first upper column, and
        (b) rotatably connected to the top of the auxiliary column.

6. A pedestal according to claim 5 wherein the first lower column is a generally cylindrical shell; the top of the first lower column fits into a recess in the lower surface of the first intermediate support; the first upper column is a generally cylindrical shell; the bottom of the first upper column fits into a recess in the upper surface of the intermediate support; the top of the first upper column fits into a recess in the lower surface of the auxiliary support; the auxiliary column is a generally cylindrical shell; and the top of the auxiliary column fits into a recess in the lower surface of the auxiliary support.

7. A pedestal according to claim 5 which can be disassembled into separate components (1)-(5) by manual forces only.

8. A pedestal according to claim 2 wherein the top of the first lower column fits over a lower conformation on the lower surface of the intermediate support, and the bottom of the first upper column fits over an upper conformation on the upper surface of the intermediate support, each of the upper and lower conformations being selected from circular recesses, annular recesses, circular projections and annular projections.

9. A pedestal according to claim 1 wherein the first upper column is a generally cylindrical shell whose upper periphery comprises 3-6 channels into which are slidably fitted a plurality of parallel horizontal support members.

10. A pedestal according to claim 1 wherein the axis of the first upper column lies within the first lower column.

11. A support which can be used as part of a pedestal according to claim 1, the support comprising a lower surface having a lower conformation which enables a lower column to be rotatably connected thereto and an upper surface having an upper conformation which overlaps and is laterally offset from the lower conformation and which enables an upper column to be rotatably connected thereto.

12. A support according to claim 11 wherein each of the upper and lower conformations is selected from circular recesses, annular recesses, circular projections and annular projections.

13. A support according to claim 11 wherein the lower conformation is a circular recess, and the upper conformation is a circular recess.

14. A pedestal which is placed on a horizontal surface and which comprises
    (1) a first lower vertical column having a top and a bottom and a first lower vertical axis, the bottom of the first lower vertical column resting on the horizontal surface
    (2) a first upper vertical column having a top and a bottom and a first upper vertical axis which is different from the first lower vertical axis, and
    (3) a first intermediate horizontal support having a lower surface and an upper surface;
    the lower surface of the first intermediate support having a rotatable connection to the top of the first lower column so that the first intermediate support can be rotated in a horizontal plane relative to the first lower column; and
    the upper surface of the first intermediate support being rotatably connected to the bottom of the first upper column so that rotation of the first intermediate support in the horizontal plane relative to the lower column changes the relative positions of the first upper vertical axis and the first lower vertical axis;
    (4) a second lower vertical column having a top and a bottom and a second lower vertical axis, the bottom of the second lower vertical column resting on the horizontal surface,
    (5) a second upper vertical column having a top and a bottom and a second upper vertical axis which is different from the second vertical axis, and
    (6) a second intermediate horizontal support having a lower surface and an upper surface;
    the lower surface of the second intermediate support being rotatably connected to the top of the second lower column so that the second intermediate support can be rotated in a horizontal plane relative to the second lower column; and the upper surface of the second intermediate support being rotatably connected to the bottom of the second upper column so that rotation of the second intermediate support relative to the second lower column changes the relative positions of the second upper column and the second lower column; and (7) an auxiliary horizontal support having a lower surface which is
  (a) rotatably connected to the top of the first upper column, and
  (b) rotatably connected to the top of the second upper column.

15. A pedestal according to claim 14 wherein the first lower column is a generally cylindrical shell; the top of the first lower column fits into a recess in the lower surface of the first intermediate support; the first upper column is a generally cylindrical shell; the bottom of the first upper column fits into a recess in the upper surface of the intermediate support; the top of the first upper column fits into a recess in the lower surface of the auxiliary horizontal support; the second lower column is a generally cylindrical shell; the top of the second lower column fits into a recess in the lower surface of the second intermediate support; the second upper column is a generally cylindrical shell; the bottom of the second upper column fits into a recess in the upper surface of the second intermediate support; and the top of the second upper column fits into a recess in the lower surface of the auxiliary horizontal support.

16. A pedestal according to claim 14 which can be disassembled into separate components (1)-(7) by manual forces only.

17. A pedestal which is placed on a horizontal surface and which comprises
  (1) a first generally cylindrical lower column having a top, a bottom, and a first lower vertical axis, the bottom of the first column resting on the horizontal surface
  (2) a first generally cylindrical upper column having a top, a bottom, and a first upper vertical axis which is different from the first lower vertical axis and which lies within the first column,
  (3) a first intermediate support having a lower surface and an upper surface;
  (4) a second generally cylindrical column having a top, a bottom and a second vertical axis which is different from (i) the first lower vertical axis and (ii) the first upper vertical axis; the bottom of the second column resting on the horizontal surface, and
  (5) an upper support;
  the lower surface of the intermediate support including a recess into which fits the top of the first lower column so that the first intermediate support can be rotated relative to the first lower column about the first lower vertical axis;
  the upper surface of the intermediate support including a recess into which fits the bottom of the first upper column so that the first intermediate support can be rotated relative to the first upper column about the first upper vertical axis; and the upper support having a lower surface which includes
    (a) a first recess into which fits the top of the first upper column so that the upper support can be rotated relative to the first upper column about the first upper vertical axis, and
    (b) a second recess into which fits the top of the second column so that the upper support can be rotated relative to the second column about a second vertical axis which is different from (i) the first lower vertical axis and (ii) the first upper vertical axis.

18. A pedestal which is placed on a horizontal surface and which consists essentially of
  (1) a lower vertical column having a top and a bottom and a lower vertical axis, the bottom of the lower vertical column resting on the horizontal surface,
  (2) an upper vertical column having a top and a bottom and an upper vertical axis which is different from the lower vertical axis, and
  (3) an intermediate horizontal support having a lower surface and an upper surface,
  the lower surface of the intermediate support having a lower conformation which makes a rotatable connection to the top of the lower column;
  the upper surface of the intermediate support being connected to the bottom of the upper vertical column so that rotation of the intermediate support in a horizontal plane relative to the lower vertical column changes the relative positions of the upper vertical axis and the lower vertical axis; and
  the center of gravity of the support lying within the lower conformation.

19. A pedestal according to claim 18 wherein the upper surface of the horizontal support has an upper conformation which makes a rotatable connection to the bottom of the upper vertical column.

20. A pedestal according to claim 19 wherein the rotatable connection between the intermediate support and the lower vertical column and the rotatable connection between the intermediate support and the upper vertical column are maintained by the forces of gravity only.

21. A pedestal according to claim 18 wherein the weight of the support is 2 to 20 times the weight of the upper vertical column.

22. A pedestal according to claim 21 wherein the center of gravity of the upper vertical column lies outside the lower column.

23. A pedestal which is placed on a horizontal surface and which consists essentially of
  (1) a lower vertical column which is a generally cylindrical shell having a top and a bottom and a lower vertical axis, the bottom of the lower vertical column resting on the horizontal surface,
  (2) an upper vertical column, which is a generally cylindrical shell having a top and a bottom and an upper vertical axis which is different from the lower vertical axis, and
  (3) an intermediate horizontal support having a lower surface and an upper surface, the lower surface of the intermediate support having a lower conformation which
    (i) is selected from circular recesses, annular recesses, circular projections and annular projections, and
    (ii) makes a rotatable connection to the top of the lower vertical column; and
  the upper surface of the intermediate support having an upper conformation which
    (i) is selected from circular recesses, annular recesses, circular projections and annular projections,
    (ii) overlaps and is laterally offset from the lower conformation, and
    (iii) makes a rotatable connection to the bottom of the upper vertical column, and
  the center of gravity of the support lying within the lower conformation.

24. A pedestal according to claim 23 wherein the rotatable connection between the intermediate support and the lower vertical column and the rotatable connection between the intermediate support and the upper vertical column are maintained by the forces of gravity only.

25. A pedestal according to claim 23 wherein the weight of the support is 2 to 20 times the weight of the upper vertical column.

26. A pedestal according to claim 23 wherein the center of gravity of the upper vertical column lies outside the lower vertical column.

* * * * *